United States Patent
Pedrini (10) Patent No.: US 6,523,731 B1
(45) Date of Patent: Feb. 25, 2003

(54) BICYCLE-CARRIER DEVICE FOR MOTOR VEHICLES

(76) Inventor: Fabio Pedrini, Via Zamboni 1, Scala A, piano 1, int. 3 40125 Bologna (IT)

( * ) Notice: Subject to any disclaimer, the term of this patent is extended or adjusted under 35 U.S.C. 154(b) by 0 days.

(21) Appl. No.: 09/624,546

(22) Filed: Jul. 24, 2000

(30) Foreign Application Priority Data

Sep. 24, 1999 (IT) .......................................... TO99A0822

(51) Int. Cl.[7] ................................................. B60R 9/00
(52) U.S. Cl. ...................... 224/537; 224/310; 224/311; 224/322; 224/323; 224/324
(58) Field of Search ................. 224/537, 310, 224/311, 322, 325, 324, 323, 564, 656, 571

(56) References Cited

U.S. PATENT DOCUMENTS

| 3,853,255 A | * | 12/1974 | Spencer ................... 224/537 X |
| 4,702,401 A | * | 10/1987 | Graber et al. ........... 224/324 X |
| 5,129,559 A | * | 7/1992 | Holliday .................. 224/524 X |
| 5,709,521 A | * | 1/1998 | Glass et al. ............. 224/324 X |
| 6,019,266 A | * | 2/2000 | Johnson ................... 224/537 X |
| 6,089,430 A | * | 7/2000 | Mehls ..................... 224/524 X |

* cited by examiner

Primary Examiner—Stephen P. Garbe
Assistant Examiner—Maerena W. Brevard
(74) Attorney, Agent, or Firm—Boyle, Fredrickson, Newholm, Stein & Gratz, S.C.

(57) ABSTRACT

A bicycle-carrier device comprises a supporting member to be mounted in cantilever fashion on the back of a motor vehicle, for supporting a bicycle in an upright position and in a vertical plane substantially perpendicular to the longitudinal direction of the motor vehicle. The supporting member comprises two cradles for supporting the wheels of the bicycle, and an auxiliary arm for clamping the bicycle in position.

20 Claims, 8 Drawing Sheets

BICYCLE-CARRIER DEVICE FOR MOTOR VEHICLES

The present invention relates to bicycle-carrier devices for motor vehicles.

The applicant has already proposed, in his Italian patent application No. TO97A000219 of Mar. 18, 1997, a bicycle-carrier device for motor vehicles, comprising a member for supporting a bicycle, provided with means for fixing it in cantilever fashion to the back of a motor vehicle, in which said supporting member is shaped to receive on it a bicycle set in an upright position in a plane perpendicular to the longitudinal direction of the motor vehicle, said supporting member comprising two cradles for supporting the wheels of the bicycle, provided with corresponding clamping means, as well as auxiliary means for clamping the bicycle, which are designed to prevent oscillation of the latter that might displace it from said correct vertical plane of positioning of the bicycle.

In the case of the above-mentioned known device, the said auxiliary clamping means comprise a pair of independent jaws provided with respective tightening knobs which are designed to engage the frame of the bicycle on opposite sides in a position corresponding to the crank axle. However, experience has shown that the wide variety of models of bicycles existing on the market entails an extremely wide range of conformations and different arrangements of the frame, with consequent problems of adjustment of the device previously proposed to any type of bicycle used. This would entail the pre-arrangement of different models of the device for different types or families of bicycles, with consequent costs and greater complications in warehousing and marketing of the device itself.

The purpose of the present invention is to provide a device of the type previously proposed, which, on the one hand, always guarantees perfect stability of the bicycle during transportation and, on the other, enables a bicycle to be mounted on it with operations that are extremely simple, easy and fast, and which, at the same time, still presents a relatively simple and economical structure and moreover is easily adaptable substantially to any type of bicycle.

In view of achieving the above purpose, the invention comprises a bicycle-carrier device of the type referred to previously, moreover characterized in that the aforesaid auxiliary clamping means comprise at least one bicycle-clamping auxiliary arm connected to said supporting member in an orientable way about an axis which is substantially perpendicular to the vertical plane of positioning of the bicycle. The possibility of orienting said auxiliary clamping arm enables the device according to the invention to be adapted to any bicycle configuration.

In a first embodiment, the aforesaid auxiliary clamping arm is mounted articulated to said supporting member and is provided at its distal end with means for engagement on the central vertical tube for attachment of the handlebars. In a first example, the aforesaid supporting member has a channel-shaped body made of plastic material, the end portions of which define the aforementioned cradles for supporting the wheels of the bicycle, said body being internally provided, in its central part, with a metal reinforcement to which the aforesaid auxiliary clamping arm is articulated.

In a second embodiment, the aforesaid supporting member comprises:

- a supporting splined shaft designed to be mounted in cantilever fashion on the rear part of a motor vehicle, with its own axis set parallel to the longitudinal direction of the motor vehicle;
- a pair of supporting arms extending in cantilever fashion from said shaft in two opposite directions that are substantially horizontal and perpendicular to the axis of the shaft;
- each of said supporting arms having one first end connected to said splined shaft by engagement of the latter in an opening having a complementary section that is made in said first end, so that said supporting arm can be mounted on said shaft in different positions differently oriented about the axis of the shaft;
- each of said supporting arms having a second end carrying an element which defines the above-mentioned cradle for supporting a respective wheel of the bicycle.

Preferably, at least the cradle element designed to receive the front wheel of the bicycle is connected to the respective supporting arm in an articulated way.

In one first version of said second embodiment, the auxiliary clamping arm is provided at its distal end with means for engagement on the central vertical tube for attachment of the handlebars of the bicycle, as in the case of the first embodiment. In the present case, preferably the aforesaid auxiliary clamping arm is mounted in an articulated way on an intermediate supporting structure, which is connected to the splined shaft by engagement of the latter inside an opening having a complementary profile made inside said intermediate supporting structure, and which can thus be mounted in positions differently oriented about the axis of the shaft. Preferably, the above intermediate supporting structure consists of a pair of parallel plates having first ends connected to the splined shaft, and second ends presenting holes set facing one another for engagement of an articulation pin of the auxiliary arm for clamping the bicycle.

A further preferred characteristic of the invention, which relates to the versions in which the aforesaid auxiliary clamping arm is provided with means for engagement of the handlebar tube, said auxiliary clamping arm is adjustable in length. Again in the case of the above-mentioned embodiment, said auxiliary arm can be turned down in a non-operating position of reduced encumbrance by rotation about its own axis of articulation.

The aforementioned means for engagement of the central vertical tube for attachment of the handlebars of the bicycle comprise a pair of jaws articulated at the end of the auxiliary arm that is further away from the supporting member, each of said jaws being provided with a clamping knob.

In a second version of the above-mentioned embodiment that uses a splined shaft for supporting the device, the auxiliary clamping arm consists of a pair of clamping elements provided with means for engagement on the two pedal cranks of the bicycle in the vicinity of the axis of rotation of the pedal cranks, substantially without direct contact with the frame of the bicycle. Experience has in fact shown that, if on the one hand bicycle frames may vary widely in terms of configuration, the conformation and arrangement of the crank shafts are substantially uniform. In addition, the possibility of mounting the aforesaid clamping elements in different angular positions on said splined shaft bestows further flexibility on the device.

Preferably, the above clamping elements consist of two plates having first ends connected to the splined shaft by engagement of the latter within an opening of complementary shape made in each plate, in such a way that said plates may be mounted in different positions differently oriented with respect to the axis of the splined shaft, said plates having moreover second ends provided with the aforesaid means for engaging the pedal cranks. Said plates are moreover each provided with a knob for causing the plates to come together against the action of elastic means.

Thanks to the characteristics described above, the device according to the invention guarantees perfect stability of the bicycle during mounting of the latter. At the same time, the operations necessary for mounting a bicycle on the supporting device according to the invention are simple, easy and fast. Basically, the user only has to lift the bicycle up and position the wheels on the two supporting cradles, which are already able to support the bicycle upright by themselves, without the user having to bother about holding the bicycle in position during the subsequent clamping manoeuvre. This latter manoeuvre is performed by means of the aforementioned auxiliary clamping arm. In the case of versions with clamping on the handlebars, the said arm is turned around its own articulation until the clamping jaws are brought onto the part of the handlebars that is to be engaged, so that the jaws can then be tightened by means of the corresponding knobs. In the case, instead, of the version with plates for clamping the pedal cranks, these plates must be simply tightened by means of the respective knobs until the bicycle is clamped in position. According to a technique in itself known, each cradle for supporting the wheels is moreover provided with a clamping clip. Of course the device can be designed for carrying two or more bicycles simply by providing a set of similar supports on the same common element for anchorage to the motor vehicle. In the case, for example, of versions with splined shaft, a number of pairs of supporting arms can be mounted in a sliding way, each pair being provided with respective supporting cradles for a respective bicycle.

The device according to the invention is characterized by high flexibility, in the sense that it can be easily adapted to even very different configurations of bicycle frames, with consequent advantages in terms of warehousing and marketing as compared to the device previously proposed.

Further characteristics and advantages of the present invention will emerge from the ensuing description, with reference to the attached drawings, which are provided purely as non-limiting examples, and in which.

Figure 1:
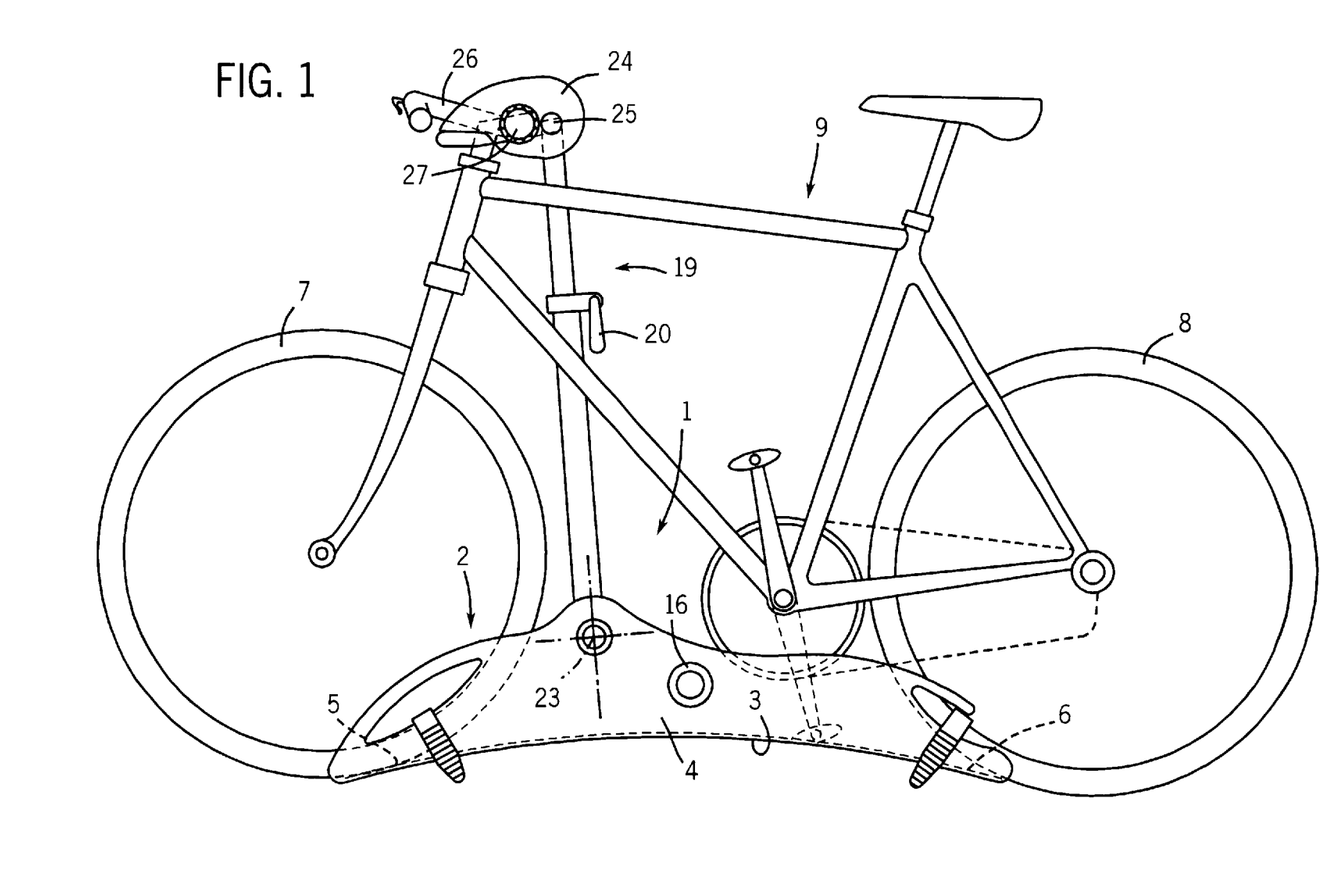
FIG. 1 is a front view of a first embodiment of the device according to the invention, with a bicycle mounted on it.

With reference to FIG. 1, number 1 designates, as a whole, a bicycle-carrier device according to a first embodiment. In said embodiment, the device comprises a body 2 made of plastic material and having a general channel configuration, with a bottom wall 3 and two parallel flaps 4. The bottom wall 3 presents an arched shape with the arch facing upwards and defines, with its end portions, together with the two flaps 4 which join together at the front, two cradles 5, 6 for supporting, respectively, the front wheel 7 and rear wheel 8 of a bicycle 9. At the opposite ends of the supporting member 2 there are provided slots 10 at one end and notches 11 at the other end for engaging clips 12 for clamping the wheels on the supporting member 1. The latter includes at its centre a generally U-shaped stiffening bracket 13 which has a bottom wall 14 and two side walls 15 (see FIGS. 2 and 3) that are fixed, for example by means of rivets or bolts, to the flaps 4 of the body 2 made of plastic material.

The supporting member 1 is stably anchored on a supporting tube 16 which is in turn anchored to the rear part of a motor-vehicle with its axis set parallel to the longitudinal direction of the motor vehicle. For the anchorage of the tube 16 to the motor vehicle, it is possible, for example, to exploit a device similar to a usual towing hook which is provided for connection of a trailer to the motor vehicle. The supporting tube 16 is rigidly connected to the supporting member 1 by tightening between the bottom wall 14 of the metal bracket 13 and two omega-shaped metal clips 17 riveted on the wall 14. In a position corresponding to each metal clip 17, a transverse pin 18 is also provided (see FIG. 2) to prevent any relative rotation between the tube 16 and the supporting member 2. Of course, the attached drawings show a single supporting member 1 mounted on the supporting tube 16, it being evident, however, that a number of supporting members altogether identical to the one illustrated herein may be provided in order to carry a number of bicycles at the rear of the motor vehicle.

As is evident from the foregoing description and from FIG. 1, the device according to the invention is designed to carry a bicycle in the upright position, as illustrated in FIG. 1, supported on the supporting member 1 and in a plane substantially perpendicular to the longitudinal direction of the motor vehicle.

Figure 2:
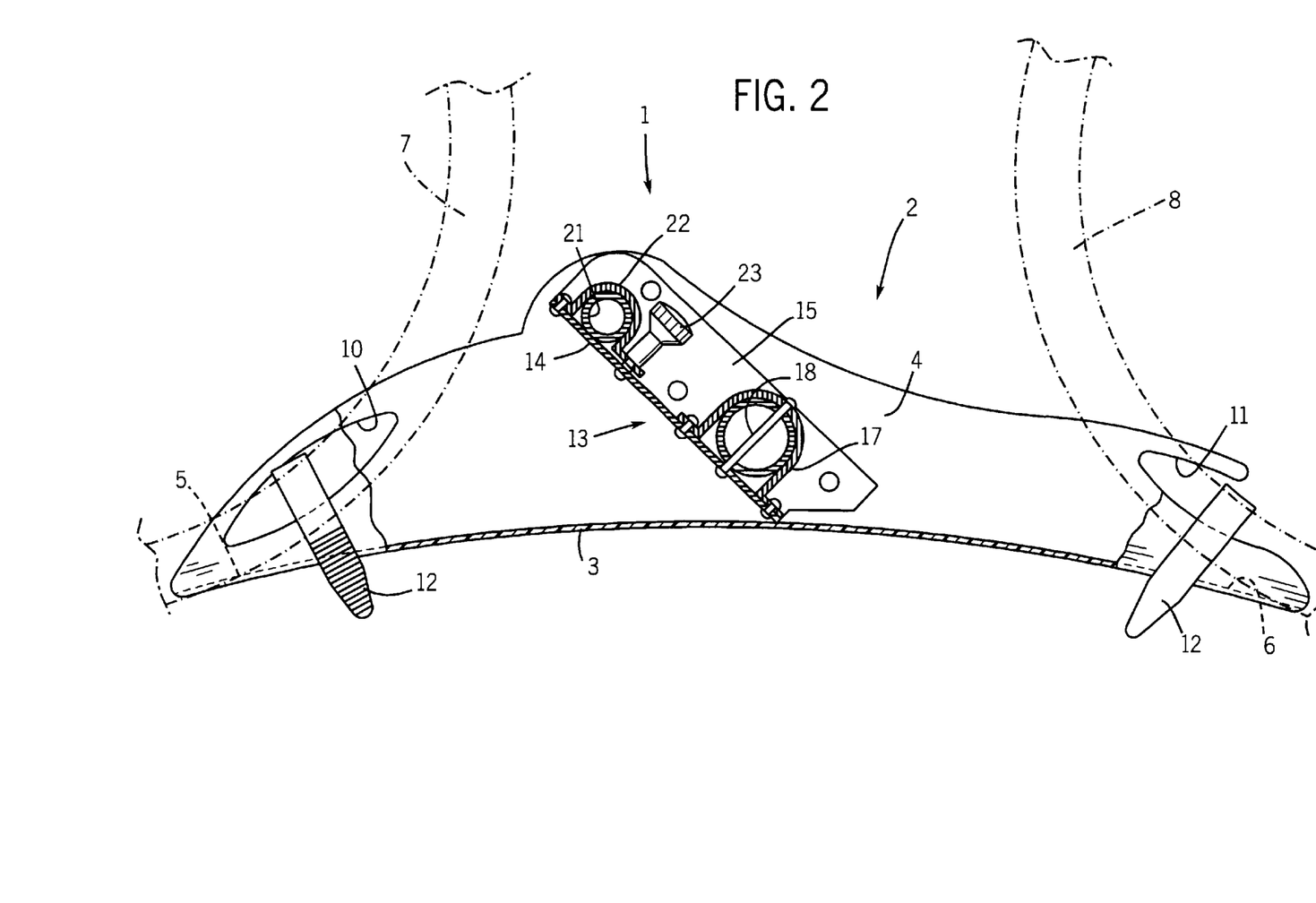
FIG. 2 is a sectional view at an enlarged scale of the device of FIG. 1.
Figure 3:
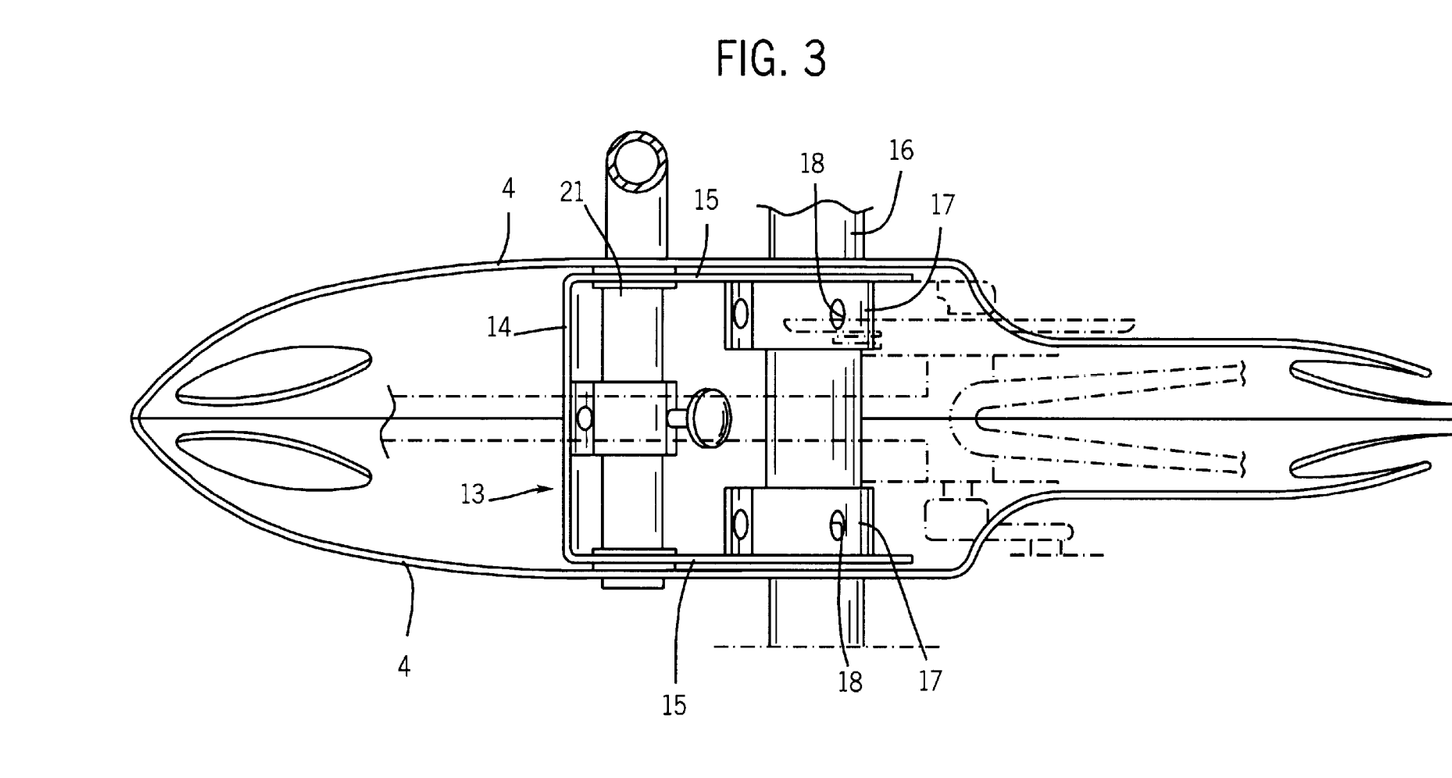
FIG. 3 is a plan view at an enlarged scale of the device illustrated in FIGS. 1 and 2.

In the case of the embodiment illustrated in FIGS. 1–3, in order to prevent any oscillation of the bicycle that might displace it from its correct plane of vertical positioning, the device according to the invention is moreover provided with an auxiliary clamping arm 19 which, in the preferred embodiment illustrated, is adjustable in length and may be clamped at any selected length by means of a clamping lever 20. The arm 19 is articulated to the supporting member 1 about an axis that is parallel to the axis of the tube 16. In the example illustrated, said articulation is obtained by means of an articulation pin 21 which is made of a single piece with the arm 19 and constitutes an appendage, bent back to form an ell, of the base portion of said arm, said pin 21 being received in the space defined between the bottom wall 14 of the metal bracket 13 and an omega-shaped clip 22, which at one end is riveted to the wall 14 and at the other end is connected to the wall 14 by means of an adjustable tightening knob 23, which enables clamping and release of rotation of the pin inside the clip 22. Thanks to this arrangement, the auxiliary arm 19 can be rotated about an axis 23 parallel to the longitudinal direction of the motor vehicle both for adapting in an optimal way to the specific configuration of the bicycle to be carried and for being turned down horizontally in a condition of reduced encumbrance when the device is not used.

At its distal end, i.e., the one more remote from the articulation 23, the auxiliary clamping arm 19 carries a pair of jaws 24 which are articulated in 25 to the arm 19 and which can be tightened on opposite sides on the tube 26 of the handlebars of the bicycle by means of a tightening knob 27.

FIGS. 4–12 illustrate a second embodiment which is conceptually similar to that illustrated in FIGS. 1–3 but differs from the latter on account of a series of constructional details which also give rise to a simplification both of fabrication and of use of the device according to the invention. In FIGS. 4–12, parts corresponding to those of FIGS. 1–3 are designated by the same reference numbers.

Figure 4:
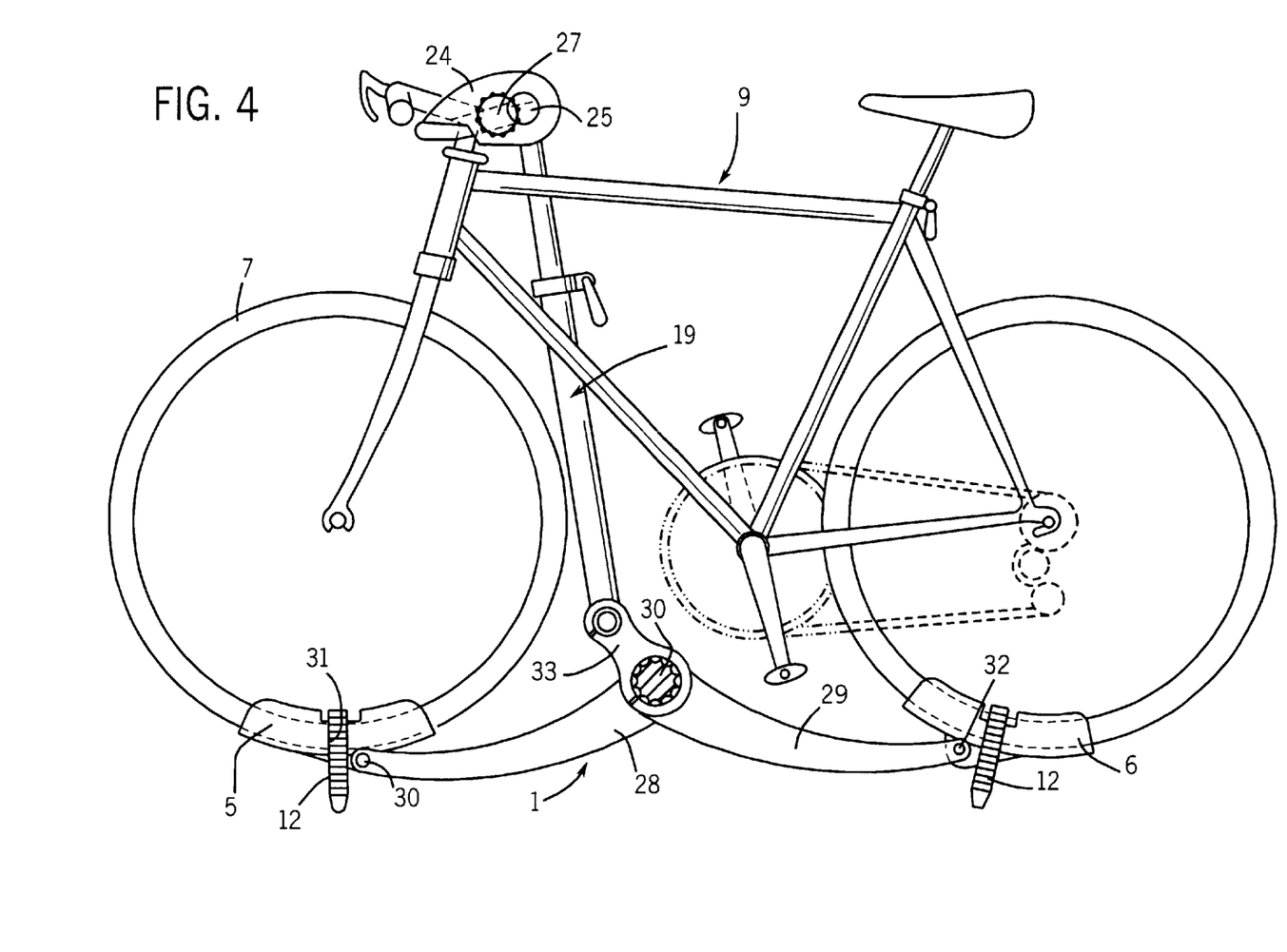
FIG. 4 is a front view of a second embodiment of the device according to the invention, illustrating to a first version thereof.
Figure 5:
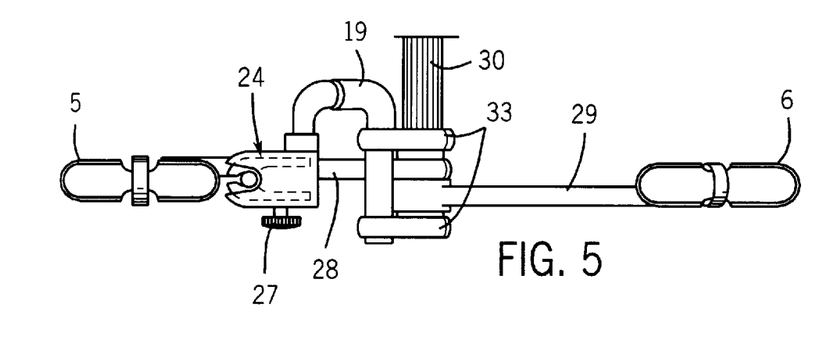
FIG. 5 is a plan view of the device illustrated in FIG. 4.
Figures 6, 7:
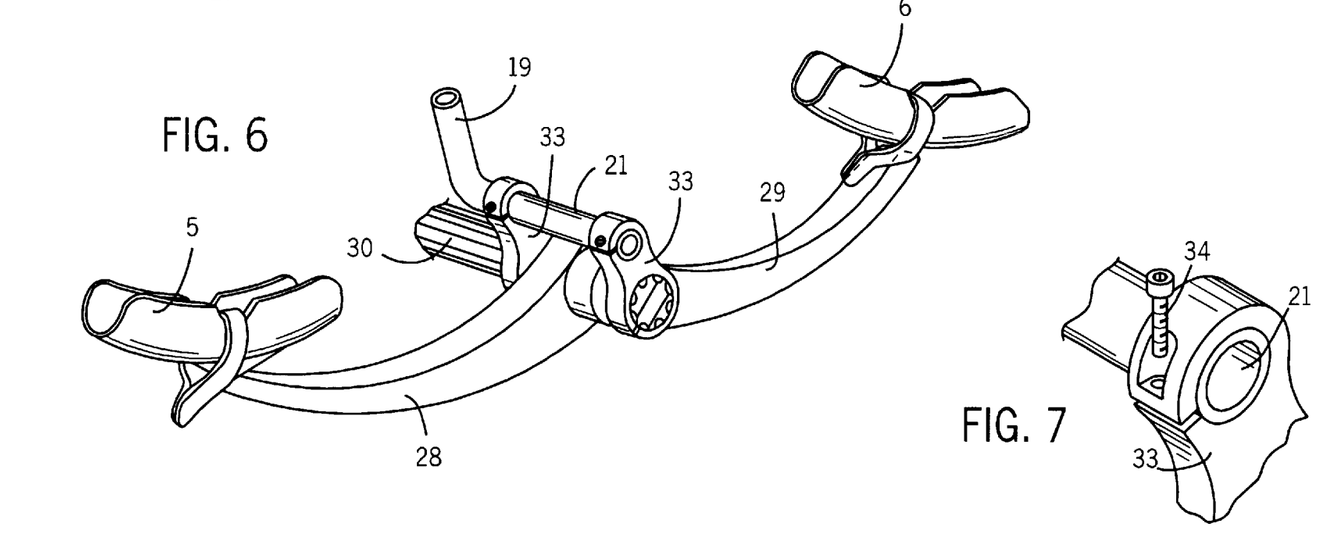
FIG. 6 is a partial perspective view of the device of FIGS. 4 and 5.
FIGS. 7 and 8 are, respectively, a perspective view and a sectional view of a detail of FIG. 6.
Figure 8:
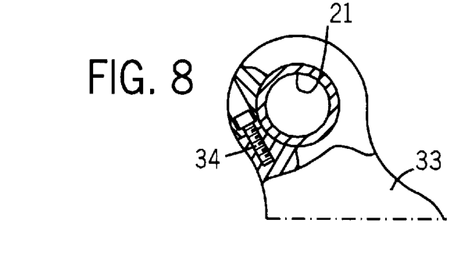

In the case of this second embodiment, the body 2 made of plastic material is replaced by a pair of supporting arms 28, 29 which are arranged substantially according to a horizontal direction perpendicular to the axis of a splined supporting shaft 30 which performs a function identical to that of the supporting tube 16 in the first embodiment. Each of the two arms 28, 29 is rigidly connected to the splined supporting shaft 30 in that it presents an opening having a profile complementary to that of the section of the splined shaft 30. In addition to enabling extremely easy assembly of the device, this arrangement also enables mounting of each arm 28 in angular positions that are different with respect to the axis of the shaft 30. The two arms 28, 29 protrude in opposite directions in cantilever fashion from the shaft 30 and carry, at their ends, two supporting cradles 5, 6 for the wheels of the bicycle, said cradles consisting of two channel-shaped arched bodies, preferably made of metal. At least the front cradle 5 is connected to the corresponding supporting arm 5 in such a way that it is articulated about an axis 30, and it is provided with the usual clamping clip 31 for clamping the respective wheel.

FIG. 4 illustrates a solution in which also the rear cradle 6 is articulated to the respective arm 29 about an axis 32, but this articulation may even not be necessary, in that in general it is sufficient, in order to adapt the device to different types of bicycles, to have the possibility of orienting even just the front cradle.

Also in the embodiment illustrated in FIGS. 4–12, the device comprises an auxiliary clamping arm 19 which is adjustable in length and carries at its distal end the two jaws 24 that can be clamped on the two sides of the handlebar tube by means of a tightening knob 27. The auxiliary arm 19 is connected in an articulated way to an intermediate supporting structure consisting of a pair of plates 33 which are anchored to the splined shaft 30 by means of engagement of the latter inside respective openings with complementary profiles that are made in the two plates 33. The latter moreover have distal ends with holes set facing one another for engagement of the pin 21 for articulation of the auxiliary arm 19, consisting of an end portion of said arm and forming an ell therewith (see FIGS. 5 and 6). The pin 21 is clamped in each plate 33 by means of a tightening screw 34 provided at a point corresponding to a groove made in one end of each plate 33 (See FIGS. 7 and 8).

Figure 9:
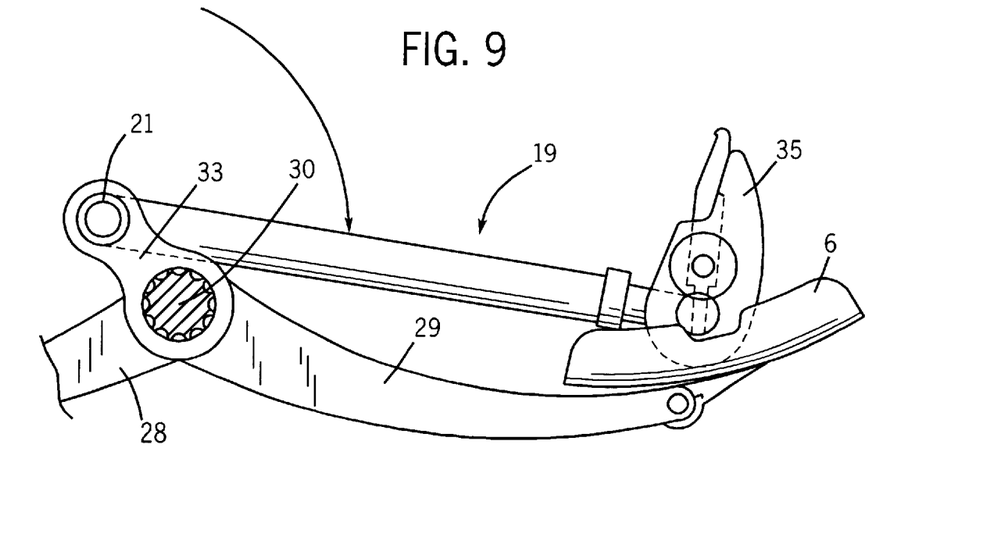
FIG. 9 is a partial view of the device of FIG. 4, in a different operating condition.

FIG. 9 of the annexed drawings illustrates the auxiliary arm 19 in the condition of minimum length and in the non-operating position, in which it is turned down horizontally on top of the rear cradle 6.

Figures 10, 11:
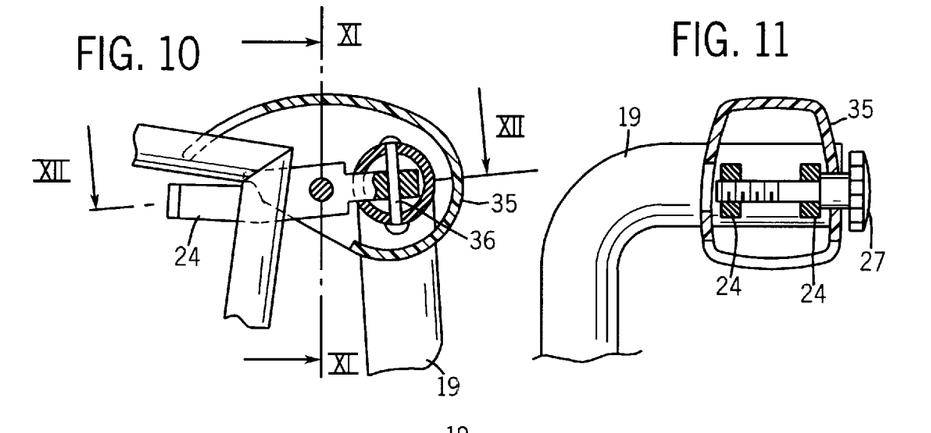
FIG. 10 is a sectional view of a detail of FIG. 4.
FIGS. 11 and 12 are sections according to the lines XI—XI and XII—XII of FIG. 10.
Figure 12:
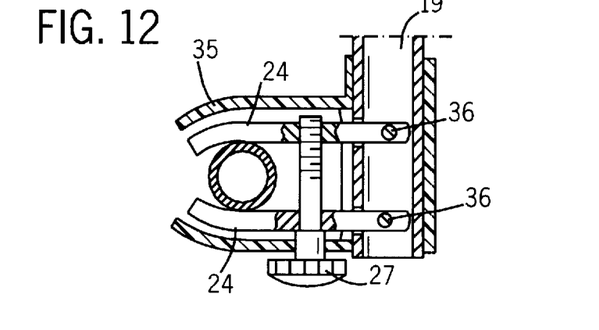
Figure 13:
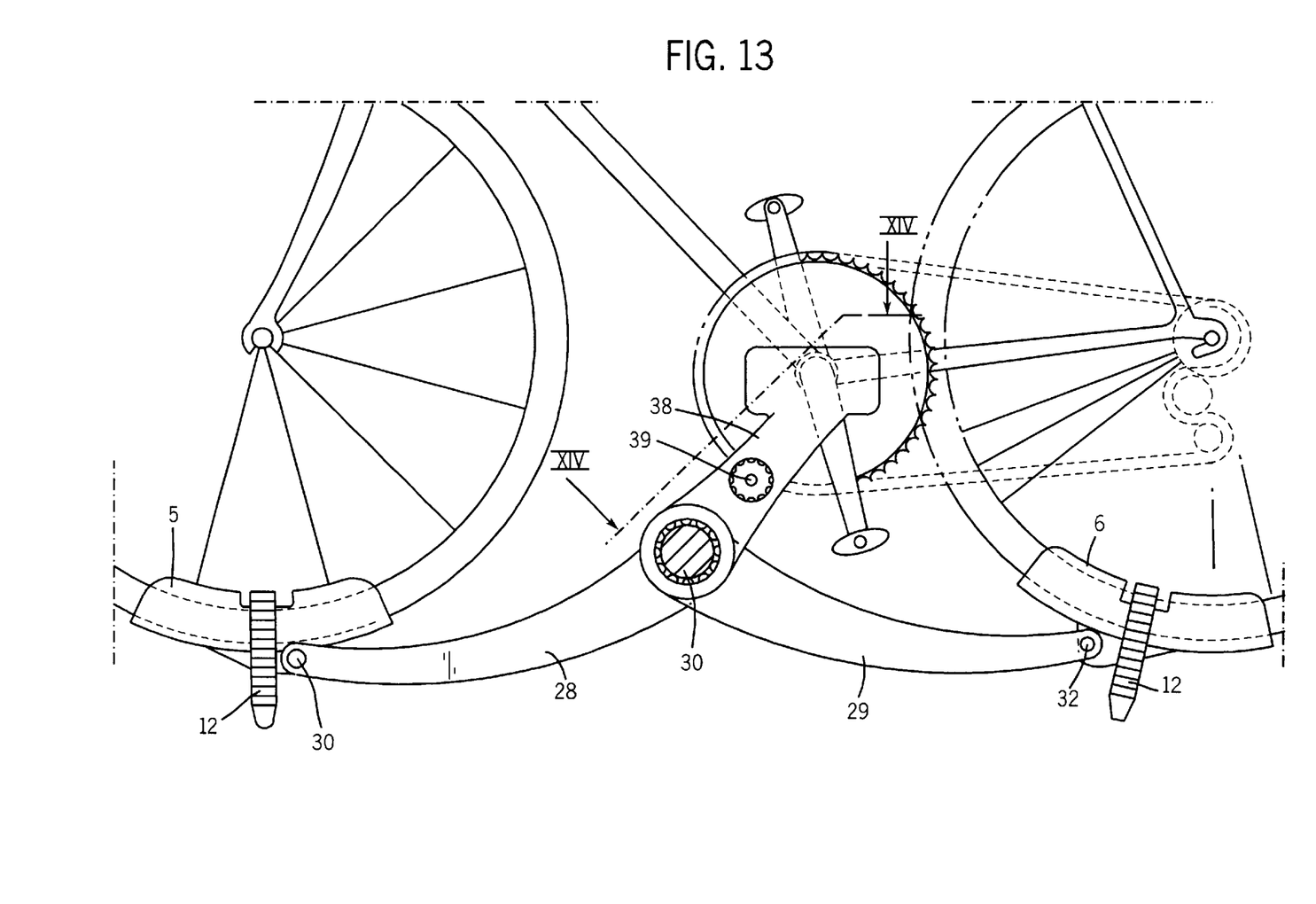
FIG. 13 is a front view of a second version of the embodiment illustrated in FIG. 4.
Figure 14:
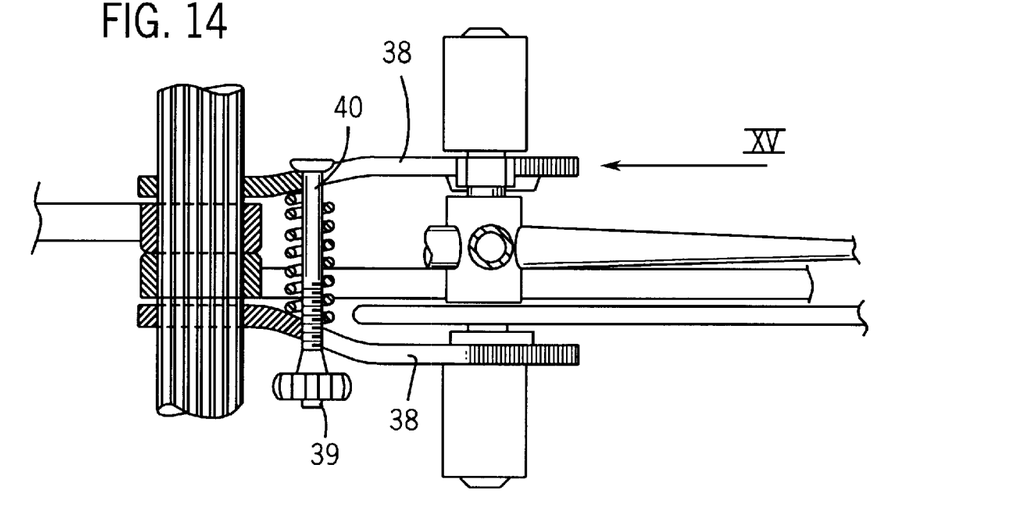
FIG. 14 is a plan view, partially sectioned, of the device of FIG. 13.
Figures 15, 16, 17:
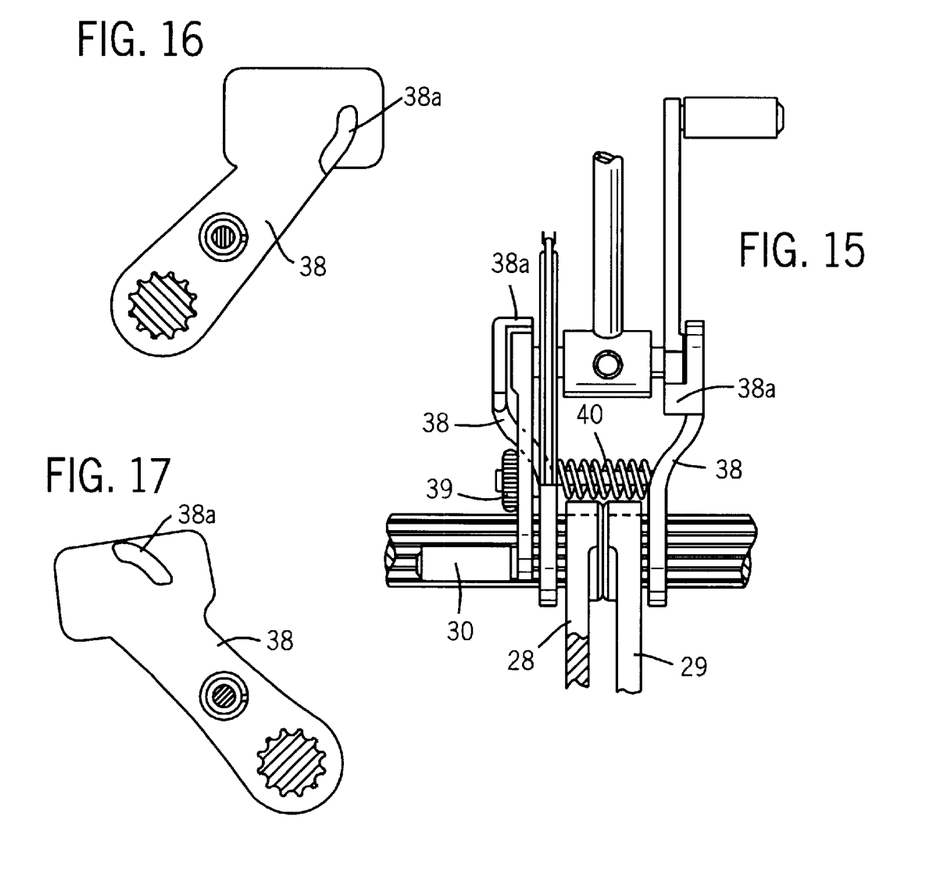
FIG. 15 is a view according to the arrow XV of FIG. 14.
FIGS. 16 and 17 are front views of the two clamping plates belonging to the device illustrated in FIGS. 13–15.

FIGS. 10–12 illustrate the structure of the vice 24, which comprises a shell 35 made of plastic material, inside which the two jaws 24 engaged by the tightening knob 27 are located. Each jaw 24 is articulated in 36 to the tube 19.

FIGS. 13–17 illustrate a third embodiment, which is substantially identical to the one illustrated in FIGS. 4–12, except for the fact that the function performed by the auxiliary clamping arm 19 in the case of the embodiment described previously is performed, in this case, by a pair of clamping plates 38, which are anchored, by means of splined fit, to the splined shaft 30 and which have distal ends designed to engage, on the two opposite sides, the pedal cranks of the bicycle without coming into contact with the frame of the bicycle in an area adjacent to the axis of the pedal cranks. For this purpose, each plate 38 has a tooth 38a protruding so as to engage the corresponding pedal crank. The two plates 38 can be clamped on the pedal cranks by means of a tightening knob 39, against the action of a return spring 40 (see FIG. 14). Also in this case, articulated assembly of the rear cradle is not essential. Thanks to this arrangement, the device is able to clamp a bicycle of any type and configuration, it having been found that the position and conformation of pedal cranks are substantially uniform in the various types of bicycles present on the market.

A further important advantage of the device according to the invention lies in the fact that, once the bicycle has been rested with its wheels on the cradles 5, 6, it is blocked vertically and in its longitudinal direction by the cradles 5, 6 themselves, so that the user does not have to bother about holding the bicycle in position while he is busy carrying out the manoeuvre of final clamping by turning the knob 39. This considerably facilitates the operations of loading and unloading of the bicycle on the motor vehicle.

In all the embodiments described above, the bicycle is therefore loaded on the motor vehicle first by setting it with its wheels resting on the cradles 5, 6, and next by clamping it in position using the vice 24 or the tightening plates 38 (with reference to the different embodiments described above). Unloading of the bicycle can be carried out by reversing the order of the operations. Of course, after it has been rested on the cradles 5, 6, the bicycle is also clamped by means of the clamping clips 12.

Obviously, without prejudice to the principle of the invention, the details of construction and the embodiments may vary widely with respect to what is described and illustrated herein purely for the purpose of providing examples, without thereby departing from the scope of the present invention.

What is claimed is:

1. A bicycle-carrier device for motor vehicles, comprising:
    a supporting member for supporting a bicycle having handlebars, wherein the supporting member includes means for fixing it in cantilever fashion on the back of a motor vehicle, in which said supporting member is shaped so as to receive on it a bicycle set in an upright position and in a plane perpendicular to the longitudinal direction of the motor vehicle, said supporting member comprising two cradles for supporting the wheels of the bicycle, which are provided with respective clamping means, as well as auxiliary means for clamping the bicycle in position, designed to prevent oscillation of the latter that might displace it from said correct vertical plane of positioning of the bicycle,
    wherein said auxiliary clamping means comprises at least one auxiliary arm for clamping the bicycle, which is connected to said supporting member in an orientable way about an axis that is substantially perpendicular to the vertical plane of position of the bicycle, wherein said auxiliary clamping arm is mounted articulated to said supporting member and is provided at its distal end with means for engagement with the handlebars of the bicycle.

2. A bicycle-carrier device for motor vehicles, comprising:
- a supporting member for supporting a bicycle, wherein the supporting member includes means for fixing it in cantilever fashion on the back of a motor vehicle, in which said supporting member is shaped so as to receive on it a bicycle set in an upright position and in a plane perpendicular to the longitudinal direction of the motor vehicle, said supporting member comprising two cradles for supporting the wheels of the bicycle, which are provided with respective clamping means, as well as auxiliary means for clamping the bicycle in position, designed to prevent oscillation of the latter that might displace it from said correct vertical plane of positioning of the bicycle,
- wherein said auxiliary clamping means comprise at least one auxiliary arm for clamping the bicycle, which is connected to said supporting member in an orientable way about an axis that is substantially perpendicular to the vertical plane of position of the bicycle:
- wherein said supporting member comprises:
  - a supporting splined shaft designed to be mounted in cantilever fashion on the rear part of a motor vehicle, with its own axis set parallel to the longitudinal direction of the motor vehicle;
  - a pair of supporting arms extending in cantilever fashion from said shaft in two opposite directions that are substantially horizontal and perpendicular to the axis of the shaft;
  - each of said supporting arms having a first end connected to said splined shaft by means of an opening having a complementary section made in said first end, so that said supporting arm can be mounted on said shaft in different positions differently oriented with respect to the axis of the shaft;
  - each of said supporting arms having a second end carrying an element which defines the above-mentioned cradles for supporting a respective wheel of the bicycle.

3. A bicycle-carrier device according to claim 1, wherein said auxiliary clamping arm is adjustable in length.

4. A bicycle-carrier device according to claim 1, wherein said auxiliary arm can be turned down into a non-operating position of reduced encumbrance by rotation about the respective axis of articulation.

5. A bicycle-carrier device according to claim 1, wherein said means for engaging the central vertical tube for attachment of the handlebars of the bicycle comprise a pair of jaws articulated to the end of the auxiliary arm that is more remote from the supporting member, said jaws being provided with a clamping knob.

6. A bicycle-carrier device according to claim 1, wherein said supporting body comprises:
- a supporting splined shaft designed to be mounted in cantilever fashion on the rear part of a motor vehicle, with its own axis set parallel to the longitudinal direction of the motor vehicle;
- a pair of supporting arms extending in cantilever fashion from said shaft in two opposite directions that are substantially horizontal and perpendicular to the axis of the shaft;
- each of said supporting arms having one first end connected to said splined shaft by means of an opening having a complementary section made in said first end, so that said supporting arm can be mounted on said shaft in different positions differently oriented with respect to the axis of the shaft;
- each of said supporting arms having a second end carrying an element which defines the above-mentioned cradles for supporting a respective wheel of the bicycle.

7. A bicycle-carrier device according to claim 6, wherein at least the cradle element designed to receive the front wheel of the bicycle is connected to the corresponding supporting arm in an articulated way.

8. A bicycle-carrier device according to claim 6, wherein said auxiliary clamping arm is mounted in an articulated way on an intermediate supporting structure which is connected to said splined shaft by engagement of the latter inside an opening having a complementary profile made in said intermediate supporting structure, which can thus be mounted in different positions differently oriented with respect to the axis of the splined shaft.

9. A bicycle-carrier device according to claim 8, wherein said intermediate supporting structure consists of a pair of parallel plates having first ends connected to the splined shaft and second ends having holes facing one another for engagement of an articulation pin of the auxiliary arm for clamping the bicycle.

10. A bicycle-carrier device according to claim 6, wherein said auxiliary clamping arm consists of a pair of clamping elements provided with means for engagement on two pedal cranks of the bicycle, in the vicinity of the axis of rotation of the pedal cranks, substantially without direct contact with the frame of the bicycle.

11. A bicycle-carrier device according to claim 10, wherein said clamping elements consist of two plates having first ends connected to said splined shaft by engagement of the latter in an opening having a complementary shape made in each plate, in such a way that said plates can be mounted in different positions differently oriented with respect to the axis of the splined shaft, said plates having second ends provided with the aforesaid means for engagement of the pedal cranks.

12. A bicycle-carrier device according to claim 11, wherein said plates are provided with a knob for causing them to approach one another against the action of elastic means.

13. A bicycle carrier device for motor vehicles, comprising:
- a supporting member for supporting a bicycle which is adapted for engagement with a supporting area of a motor vehicle, in which the supporting member is shaped so as to receive on it a bicycle set in an upright position and in a plane generally perpendicular to the longitudinal direction of the motor vehicle, wherein the supporting member comprises two cradles for supporting the wheels of the bicycle, which are provided with respective clamping means, and an auxiliary clamping arrangement for clamping the bicycle in position so as to prevent oscillation of the bicycle, wherein the auxiliary clamping arrangement comprises an auxiliary arm for clamping the bicycle which is adapted to be connected to the supporting member in an orientable way about an axis that is substantially perpendicular to the plane of positioning of the bicycle, wherein the supporting member includes:
  - a supporting shaft having a non-circular cross section adapted to be mounted to the vehicle, and defining an axis substantially parallel to the longitudinal direction of the vehicle;
  - a pair of supporting arms extending in cantilever fashion from the shaft in opposite directions and which extend generally perpendicular to the axis of the shaft;

wherein each of the supporting arms has a first end connected to the shaft by means of an opening in the first end having a complementary shape to the cross section of the shaft, so that the supporting arm can be mounted on the shaft in different positions with respect to the axis of the shaft; and wherein each supporting arm has a second end carrying an element that defines one of the cradles for supporting a respective wheel of the bicycle.

14. The bicycle carrier of claim 13, wherein the supporting arms have a generally equal length.

15. The bicycle carrier of claim 13, wherein the supporting shaft has a splined cross section.

16. A bicycle carrier device for motor vehicles, comprising:

a supporting member adapted to be engaged with the vehicle, wherein the supporting member extends along an axis substantially parallel to the longitudinal axis of the vehicle; and a pair of supporting arms extending outwardly from the supporting member in opposite directions, wherein each supporting arm is adapted to support one of the wheels of a bicycle;

wherein the supporting arms are engaged with the supporting member by means of a variable position engagement arrangement, wherein the orientation of the supporting arms can be varied relative to the supporting member and relative to each other.

17. The bicycle carrier of claim 16, wherein the variable position engagement arrangement comprises an irregular cross section associated with the supporting member, and a mating opening having an irregular cross section associated with an inner end of each arm, wherein the irregular cross section of the supporting member and the inner end of each arm enable the inner end of each arm to be engaged with the supporting member in different angular orientations.

18. The bicycle carrier of claim 17, wherein the irregular cross section of the supporting member comprises a splined cross section and wherein the opening in the inner end of each arm has a mating splined configuration.

19. A method of carrying a bicycle on a vehicle, comprising:

engaging a supporting member with the vehicle, wherein the supporting member extends along an axis substantially parallel to a longitudinal axis defined by the vehicle;

engaging a pair of arms with the supporting member, wherein each arm extends laterally outwardly and includes a support arrangement;

placing a bicycle on the arms, wherein the outer end of each arm engages a lower portion of the bicycle for supporting the bicycle thereabove;

stabilizing the bicycle against movement by engaging a clamping arrangement with the bicycle at a location above the outer ends of the arms; and selectively adjusting the angular position of the arms relative to each other by adjusting engagement of the arms with the supporting member.

20. The method of claim 19, wherein the step of adjusting the angular position of the arms relative to each other is carried out by forming an opening in an inner end defined by each arm, when the opening is adapted to receive the supporting member therein, and wherein the opening and the supporting member have an irregular cross section which enables the arm to be engaged with the supporting member in varying angular orientations.

* * * * *

UNITED STATES PATENT AND TRADEMARK OFFICE
CERTIFICATE OF CORRECTION

PATENT NO. : 6,523,731 B1
DATED : February 25, 2003
INVENTOR(S) : Fabio Pedrini

It is certified that error appears in the above-identified patent and that said Letters Patent is hereby corrected as shown below:

Column 7, line 52 through Column 8, line 1,
Delete existing claim 6 in its entirety and replace it with the following:
-- 6. A bicycle-carrier device according to Claim 1, wherein said supporting member has a channel-shaped body made of plastic material, the end portions of which define the aforesaid cradles for supporting the wheels of the bicycle, said body being internally provided, in its central part, with a metal reinforcement to which said auxiliary clamping arm is articulated. --

Column 8,
Lines 4, 8 and 22, delete "6" and substitute therefore -- 2 --.

Signed and Sealed this

Twenty-second Day of March, 2005

JON W. DUDAS
*Director of the United States Patent and Trademark Office*